United States Patent [19]

Roger

[11] Patent Number: 4,512,370
[45] Date of Patent: Apr. 23, 1985

[54] HIGH AND LOW PRESSURE SENSOR

[76] Inventor: Harry Roger, 124 Banks Ave., Lafayette, La. 70506

[21] Appl. No.: 553,118

[22] Filed: Nov. 18, 1983

Related U.S. Application Data

[63] Continuation of Ser. No. 312,095, Oct. 16, 1981, abandoned.

[51] Int. Cl.³ .............................................. F16K 11/07
[52] U.S. Cl. ............................... 137/625.66; 137/458; 137/625.68
[58] Field of Search ............... 137/458, 625.66, 625.68

[56] References Cited

U.S. PATENT DOCUMENTS 3,621,881 11/1971 Vicari ............................. 137/625.66
4,239,058 12/1980 Peters ............................. 137/458 X

*Primary Examiner*—Robert G. Nilson
*Attorney, Agent, or Firm*—Guy E. Matthews

[57] ABSTRACT

A three position, high and low, block and bleed fluid pressure sensor, wherein a piston contained within a cylinder is urged in one direction by a fluctuating sensed fluid pressure and opposed by a single spring located within said cylinder housing. The cylinder housing includes inlet and outlet ports, and at least one venting port. When the equilibrium of the forces between the spring and the fluid port pressure places the piston in a first position, the inlet and outlet port are allowed to communicate by way of an internal passageway formed within the piston and the sensed fluid may pass therethrough. When the pressure exerted by the fluctuating port pressure is greater or lower than the desired range, the piston will assume a second or third position wherein the inlet and outlet ports are misaligned whereby the inlet port is blocked and the outlet port merely discharges residual fluid through one of the venting ports. The range of the first position may be adjusted by rotating an upper portion of the piston with respect to a lower portion of the piston. This rotation may be accomplished exteriorally of the pressure sensor by inserting a tool into the cylinder housing to lengthen or shorten the access of the outlet port to the internal passageway communicating with the inlet port. The spring may be adjusted by means of the threaded end cap of the cylinder housing. A lock nut may be provided for mounting the sensor in a rigid panel.

8 Claims, 4 Drawing Figures

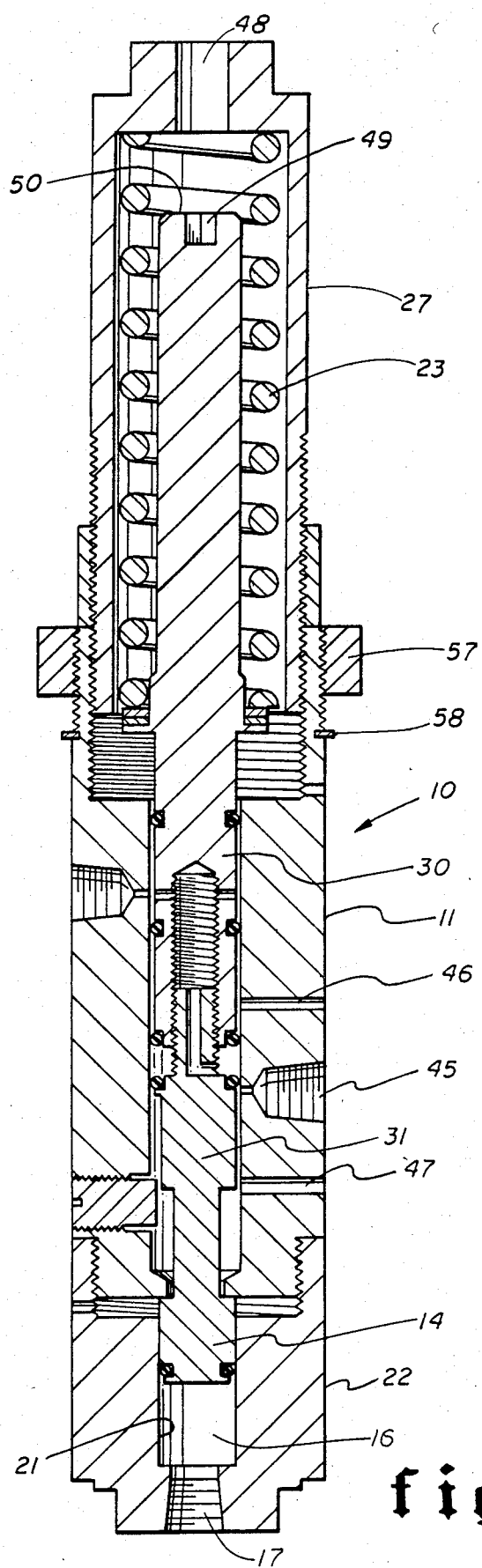
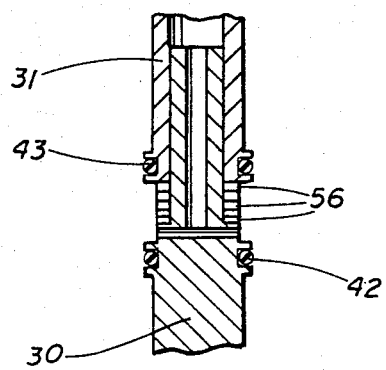
fig.4
fig.3

HIGH AND LOW PRESSURE SENSOR

This is a continuation of application Ser. No. 312,095, filed Oct. 16, 1981, now abandoned.

FIELD OF THE INVENTION

The present invention relates generally to a high and low, block and bleed type pressure sensor. Specifically, the present invention relates to a high and low pressure sensor which allows continuous and infinitely variable adjustment of its operating range in response to a fluctuating pilot fluid pressure without disconnecting the sensor or interrupting the operation of the fluid system it is monitoring and controlling.

BACKGROUND OF THE INVENTION

Pressure sensing devices have been known and used extensively in the petrochemical, process, and other industries involving fluid systems. In general, a pressure sensor is responsive to a fluctuating sensed fluid pressure. The level of pressure is transduced within the sensor, which either enables or blocks the flow of a pilot fluid through a passageway in the sensor. Thus, such devices act as a variable position valve. Pressure sensors are useful, for instance, as automatic shuf-off devices to prevent the continued flow of a inflammable or explosive fluid during a fire or other emergency. Alternatively, a pressure sensor may be used to activate an automatic sprinkler system in a similar situation.

The operation of conventional pressure sensors is usually accomplished by using a piston and cylinder assembly. The piston is exposed to the fluctuating sensed fluid pressure which urges the piston in one direction along the cylinder. A spring, or like resilient device, urges the piston in the opposite direction. Equilibrium of these forces at any given moment determines the position of the piston within the cylinder. By calibrating these positions, it is possible to accurately transduce the pilot pressure into a particular position of the piston.

Typically, the piston may include grooves on its outside surface. The cylinder includes offset input, output, and vent ports for the passage of the pilot fluid. Passage of fluid from one port to another is normally blocked by the presence of the piston. The piston grooves may be sealed from each other and so constructed in relation to the distances offsetting the ports that communication is enabled between only two of the ports at a time through the space within the cylinder defined by the grooves. When the sensed fluid is pressurized with a desired range, the piston is positioned so as to allow the flow of the sensed fluid from the input port, through the device and exiting through the output port. When exposed to pilot pressures other than those desired, the piston will assume a position which will block the passage of the pilot fluid and enables communication between the outlet port containing residual pilot fluid to a vent port.

Frequently, it is necessary to modify the response characteristics of a pressure sensor to accomodate varying processes and operations. U.S. Pat. No. 4,091,832, issued to Snyder et al, discloses a high or low only pressure sensing valve in which the characteristics of the device may be altered by increasing or decreasing the force exerted by the spring. The force exerted on the spring is adjusted by rotating a threaded end cap which constrains the spring within the cylinder, thereby increasing or decreasing its compression. The response of the valve may also be varied by disconnecting the pressure sensor and replacing the lower portion thereof containing the piston with a corresponding module containing a piston of smaller or larger diameter. The smaller the diameter, and therefore the area, the smaller the force exerted by the sensed fluid on the piston.

U.S. Pat. No. 4,258,741, issued to Roger, again shows a spring loaded piston-cylinder device wherein the tension exerted by the spring may be similarly externally adjusted by rotation of a threaded end cap which varies the compression on the spring. The opposing force exerted on the piston by the pilot fluid may be altered by modifying the effective diameter of the piston. This is, accomplished by constructing a piston of two components. The first component is a cylinder slidingly engaged within the cylinder having a concentric opening defined therewithin. The opening is comprised of two regions of staggered diameters. A second component with conforming characteristics is slidably engaged within the opening. By dismantling the pressure sensor device and altering the orientation of the piston, the effective surface area may be suitably altered.

Conventional pressure sensors combining high and low sensing capabilities generally utilize two separate springs for adjustment of response characteristics. One spring is adjustable to modify low pressure response characteristics, while the second spring is similarly adjustable and acts with the first spring to control high pressure response.

However, these and other conventional designs exhibit several inefficiencies. Although the ability to alter the compression on a spring or springs is a useful means of affecting the response characteristics of a pressure sensor, frequently it is inadaquate to accommodate the extreme variation in sensed fluid pressure levels and does not enable control over the range of pressures within which the sensor allows the passage of pilot fluid therethrough. The fact that the grooves formed in the surface of the piston in existing devices are of fixed length precludes any possibility of affecting this response range.

Further, the process of disconnecting the pressure sensor from the fluid system, removing and replacing a given piston with one of a different diameter, or one formed with grooves of different lengths, or altering the effective diameter of the piston, is inherently inefficient and labor intensive. Physically interchanging or modifying components of the sensor necessarily entails extended downtime for the fluid system and the construction and maintenance of an extensive and costly inventory of piston modules of varying characteristics. Since each piston is contructed of a fixed diameter and contour, a finite set of such pistons are able only to accomodate a discrete number of response ranges and levels. It is frequently desirable to adjust the pressure sensor over a continuous and infinitely variable range of response levels, and it is also desirable to be able to adjust the response without dismantling or removing the pressure sensor from the input and out flow fluid conduits and without disturbing the operation of the overall system.

Therefore a principal feature and advantage of the present invention is to provide a high and low pressure sensor wherein the range of desired operating pressures is continuously and infinitely variably adjustable.

It is another feature and advantage of the invention to provide a pressure sensor which enables its response characteristics to be altered without disconnecting the sensor from the fluid system.

It is yet another feature and advantage of the invention to provide a pressure sensor which may be adjusted without disrupting the operation of the fluid system.

It is another feature and advantage of the invention to provide a more economical high and low pressure sensor with a reduced number of components.

Therefore, these and other features and advantages of the invention will become more clearly evident upon a detailed examination of the following drawings, claims, and description, wherein like numerals denote like parts in the several views.

SUMMARY OF THE INVENTION

The present invention discloses a high and low pressure sensing device which includes a spring loaded piston and cylinder assembly. Upper and lower pistons are utilized, both slidably engaged within a cylinder housing so as to enable end to end contact between the pistons. Offset inlet and outlet ports communicate with the chamber containing the upper piston, but are normally blocked from communication with each other by the presence of the upper piston. The surface of the upper piston includes concentric grooves defining spaces within the chamber which are mutually sealed, whereby fluid communication between them is prevented. Two of the grooves are connected by an internal passageway within the upper piston whereby the offset inlet and outlet ports communicate when the piston is positioned within a range determined by the length of the grooves such that each port is in positioned adjacent a groove at either end of the internal passageway. A higher or lower pressure than is determined by this range will position the piston so that communication is impossible between the inlet and outlet ports. In either case, the inlet port is blocked and the outlet port is allowed to vent through one or more venting ports exteriorly of the pressure sensor.

The present invention includes a threaded end cap which allows the adjustment of the compressive force exerted by a single spring. However further, it also includes means for adjusting the range of pressures within which fluid flow through the pressure sensor is allowed. This is accomplished by constructing an upper piston of two components. A lower component is in contact with the lower piston and includes a threaded stem projecting upwardly through the cylinder chamber. A corresponding upper component threadedly engages the lower component. Relative rotation of the components will extend or shorten the overall length of the upper piston. The gap between the upper component and a shoulder on the lower component defines one of the grooves communicating with the internal passageway in the upper piston. The groove at the other end of the internal passageway is of sufficient fixed length so as to be in continuous communication with the inlet port throughout the travel of the upper piston within the cylinder housing.

The end cap has an opening which allows access exteriorly of the device to engage the facing surface at the top of the upper component of the piston. By engaging a hexagonal cavity with a hex key or like tool, relative rotation of the two components may be induced, so as to lengthen or shorten the range in which the inlet and outlet ports may be connected by the internal passageway. Thus, continuous and infinitely variable adjustment of the range of desired pressures is enabled without the necessity of disconnecting or disassembling the pressure sensor. Likewise, the operation of the entire system to which the pressure sensor is connected is uninterrupted.

BRIEF DESCRIPTION OF THE DRAWINGS

FIG. 3 is a cross-sectional view of the invention in a high pressure mode.

FIG. 4 is a detailed view of an alternative embodiment of the invention.

DETAILED DESCRIPTION OF THE INVENTION

Figure 1:
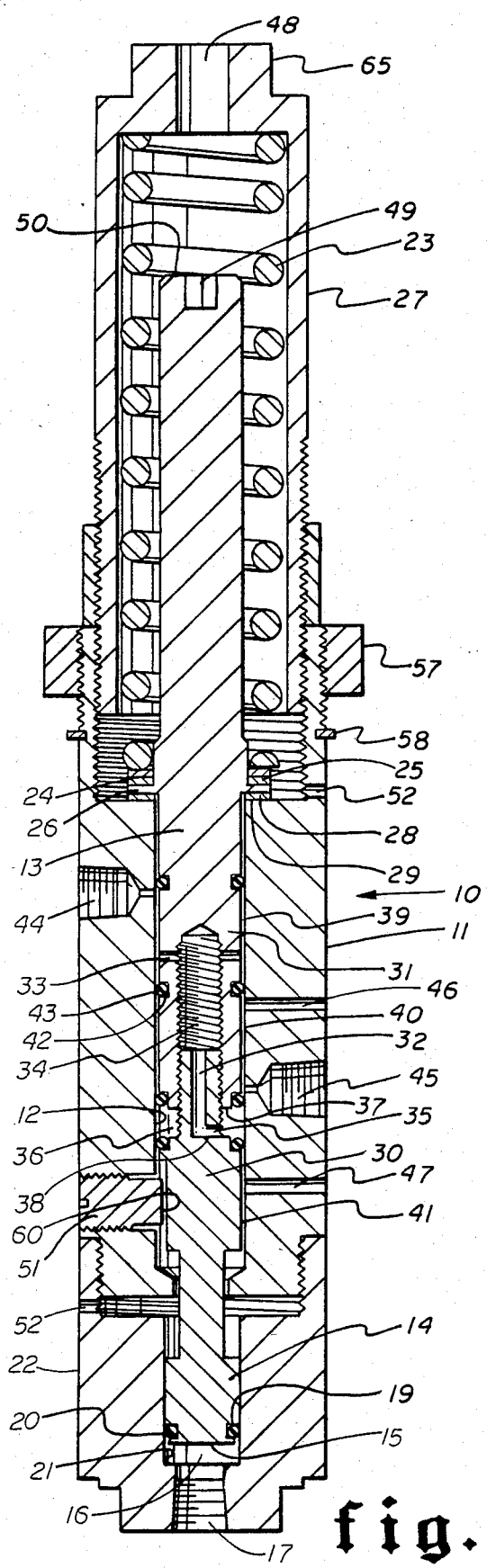
FIG. 1 is a cross-sectional view of the invention in a low pressure mode.
Figure 2:
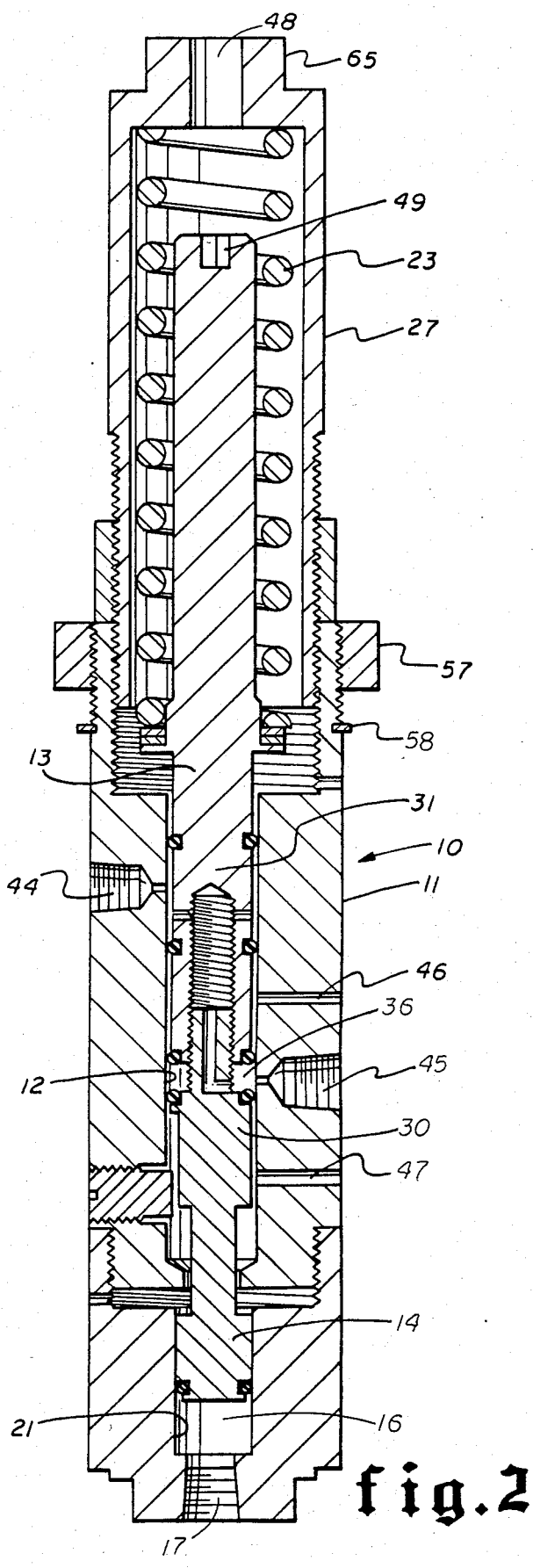
FIG. 2 is a cross-sectional view of the invention in a flow through mode.

Referring now to FIGS. 1-3, the numeral 10 generally indicates the pressure sensing device as herein described. The device includes a cylinder housing 11, which defines an internal piston chamber 12, wherein a first or upper piston 13 is slidably and sealingly engaged. The length of the first piston 13 is shorter than that of the first piston chamber 12 so as to allow longitudinal movement therewithin. A second piston 14 slidably engages a second piston chamber 21 within a lower end cap 22. The lower end cap 22 is threadedly or otherise suitably connected to the cylinder housing 11 whereby the first and second pistons are concentrically aligned and capable of contact. The second piston 14 has a first end which defines a surface 15 exposed and in contact with the sensed fluid 16. The sensed fluid 16 enters the piston chamber 12 through a fluid port 17 located at one end of the cylinder housing 11. A groove 19 in the second piston 14 and an O-ring 20 provide an effective seal against the walls of the second piston chamber 21 so as to hermetically isolate the sensed fluid 16 from the remainder of the piston chamber. The fluctuating pressure of the sensed fluid 16 exerts a force on the surface 15 of the piston 14, urging the piston in a direction away from the sensed fluid port 17.

The position of the piston 13 is influenced by the presence of a spring 23 or a similar resilient device which opposes the force exerted by the pressurized sensed fluid 16. These opposing forces push the first and second pistons 13 and 14, to act as a unit within the cylinder housing 11 and upper and lower end caps 27 and 22. The equilibrium of forces between the spring 23 and the sensed fluid pressure at any given moment determines the position of the pistons 13 and 14. The spring 23 engages a spring plate 24 concentrically arranged on the first piston 13. A bearing plate 25 is similarly mounted between the spring plate 24 and a shoulder 26 on the piston 13. The bearing plate 25 and spring plate 24 reduce the force necessary to rotate the spring 23 during adjustment, as will be explained in more detail later.

An upper end cap 27 threadedly engages the cylinder housing 11. The rotation of the end cap 27 relative to the cylinder housing 11 compresses or releases the spring 23 and requires a greater or lower level of pressure of the sensed fluid 16 to position the piston 13 at a particular location within the cylinder housing 11. The upper end cap 27 may possess a square shaped section 65 so as to facilitate the use of a tool in assisting the adjustment of the spring 23. In the preferred embodiment of the invention, the upper end cap 27 is of no greater diameter than the cylinder housing 11 and has external threads which engage internal threads on the cylinder housing 11. The pressure sensor of the present invention may also include a shoulder 58 and threadedly mounted lock nut 57, whereby the upper end cap 27 and cylinder housing 11 may be inserted into an appropriately sized opening in a rigid panel or the like and secured therein by rotation of the lock nut towards the shoulder. By constructing an end cap as hereinabove described, the pressure sensor 10 may be inserted into the panel without removing the end cap 27, thus preventing the necessity of readjusting the sensor.

The reciprocating motion of the first piston 13 is restrained on one end by the contact of the teflon washer 28 beneath the shoulder 26, and a shoulder 29 within the piston chamber 12 and at the other end by contact between the piston 13 and the upper end cap 27.

The piston 13 is comprised of two components, a first or lower component 30 and a second or upper component 31, threadedly engaged with the upper section so as to form a unitary structure 26. The effective length of the piston 13 may be altered by relative rotation of the lower component 30 with repect to the upper component 31. In the preferred embodiment of the invention, the upper and lower components 30 and 31 are formed with left hand threads. In this configuration, the high level pressure response of the present invention may be adjusted without affecting the low pressure response by rotating the upper component 31 in a conventional clockwise manner, as will be explained in more detail later.

An internal passageway 32 through the piston 13 is defined by a conduit 33 which communicates with conduit 34 and includes an outlet 35 at the juncture of the upper and lower components 30 and 31.

The upper and lower components of the invention include at least four concentric grooves which define voids or spaces within the piston chamber 12 when the piston 13 is inserted therewithin. A groove 36 is defined by the gap between the lower surface 37 of the upper component 31 and a shoulder 38 on the lower component 30. The groove 36 communicates with the outlet 35. Communicating with the other end of the internal passageway 32 is a groove 39 of fixed length. A similar fixed length groove 40 is formed intermediate of the grooves 36 and 39. Finally, a groove 41 is defined by the portion of the lower component 30 having a diameter smaller than that of the cylinder chamber 12. Each concentric groove is hermetically sealed and isolated from each of the other grooves by ridges 42 and O-rings 43 located between the grooves, as shown.

The cylinder housing 11 further includes an inlet port 44 and an outlet port 45, for the inflow and egress of the pilot fluid therethrough. Both ports communicate with the piston chamber 12 but are normally blocked by the presence of the piston 13. The inlet and outlet ports 44 and 45 are enabled to communicate when the piston 13 is positioned such that the inlet port 44 communicates with the groove 39 at one end of the internal passageway 32, and the outlet port 45 communicates with the groove 36, being at the other end of the internal passageway.

The length of the groove 39 is so constructed as to assure continuous communication with the input port 44 throughout the full length of travel available to the piston 13 within the cylinder chamber 12. Similarly, the intermediate groove 40 is of sufficient length and so situated and arranged on the piston 13 as to be in continuous communication with a low pressure vent 46. The groove 41 is likewise in continuous communication with a high pressure vent 47.

The sensor 10 is so constructed as to have three available modes. As determined by the fluctuating sensed fluid pressure, the outlet port 45 will either be in communication with the groove 36, and hence with the inlet port 44, or it will be in communication with the groove 40, in which case it is bleeding exteriorly of the pressure sensor 10 by way of the vent 46. Finally, the outlet port may be in communication with the groove 41 so as to discharge through the vent 47. These modes are illustrated in FIGS. 1 through 3. In none of the three modes is the inlet port 44 allowed to communicate with either vent 46 or 47. Additional tattletale vent ports 52 may be formed in the cylinder housing 11 as shown so as to allow the discharge of any sensed or pilot fluid which may penetrate past the seals.

In FIG. 1 the invention is displayed wherein the fluctuating pilot fluid pressure is in a low pressure mode. That is, the force exerted by the sensed fluid 16 does not overcome the force exerted by the spring 23 sufficiently to position the outlet port 45 in alignment with the second groove 36. Therefore, the outlet port 45 communicates with the groove 40, which allows residual controlled fluid to bleed through a low pressure vent port 46. The inlet port 44 communicates only with the internal passageway 32 which empties into the groove 36, but is not allowed to flow therefrom.

FIG. 2 illustrates the invention wherein the pilot fluid pressure is sufficient to place the inlet port 44 and the outlet port 45 in communication through the internal passageway 32, as previously described.

FIG. 3 illustrates the invention wherein the sensed fluid pressure is great enough to push the piston 13 beyond the point wherein the inlet and outlet ports are allowed to communicate. The outlet port 45 communicates with a groove 41, which in turn communicates with a high pressure vent 47.

The upper end cap 27 includes an opening 48. This opening provides exterior access to a hexagonal cavity 49 formed within the top surface 50 of the upper portion 31. By engaging the cavity 49 with a hex key or the like, relative rotation of the components 30 and 31 of the piston 13 may be accomplished and the length of the piston 13 varied thereby. Alternatively, a slot may be formed in the upper surface 50 in place of the hexagonal cavity 49 and a screwdriver or the like used to induce rotation of the upper component 31. In yet another alternative embodiment of the invention, the upper portion 31 of the first piston 13 may be of sufficient length so as to extend through the opening 48. A suitable upper portion 31 may be formed with a handle, knob, or the like so as to facilitate the manual external adjustment of the groove 36. In any case, the teflon washer 28 reduces the force necesssary to rotate the upper portion 31.

It will be noted that a stop 51 may be radially mounted in the cylinder housing 11 so as to engage a flat surface 60 formed in the piston 13, thereby preventing movement of the lower component 30 of the piston when a rotational force is applied to the upper component 31. Thus, the gap between the surfaces 37 and 38 in the groove 36 may be varied, which in turn determines the range of pressures within which the inlet and outlet ports 44 and 45 are allowed to communicate. As will readily be understood, this adjustment may be accomplished while the device is connected in a fluid system and while the system is operating.

FIG. 4 illustrates an alternative embodiment of the present invention wherein the upper portion 30 and lower portion 31 of the piston 13 are not threadedly engaged, but rather form a relative sliding fit wherein adjustment of the range of the groove 36 is accomplished by disassembling the device and placing a plurality of concentric shims 56 between the upper and lower portions. It will be noted that this embodiment of the invention precludes external adjustment but provides a more permanent and exacting means of adjusting the effective pressure range of the device. In all other respects the operation the pressure sensor is unefected.

In the foregoing it will be seen that this invention is one well adapted to obtain all of the ends and objects hereabove set forth, together with other advantages which are obvious and which are inherent to the apparatus.

It will be understood that certain features and subcombinations are of utility and may be employed with reference to other features and subcombinations. This contemplated by and is within the scope of the claims.

As many possible embodiments may be made in the invention without departing from the scope thereof, it is to be understood that all other matter herein set forth are shown in the accompanying drawings is to be interpreted as illustrative and not in a limiting sense.

For instance, it will be noted that it is within the concept of the invention to include a further alternative means of adjusting the response of the invention by providing a lower end cap 22 of the cylinder housing 11 which is detachable and threadedly connected with the cylinder housing so as to allow removal when desired and replacement with a second piston 14 of smaller or larger diameter, if so desired.

The invention having been described, what is claimed and desired to be secured by U.S. Letters Patent is:

1. A high and low pressure sensor, comprising:
   (a) a cylinder housing having a piston chamber therewithin, said cylinder housing further having an inlet port for enabling the entry of a first pressurized fluid into said piston chamber, an outlet port for enabling egress of said first pressurized fluid from said piston chamber, a plurality of venting ports for enabling bleeding of any residual of said first pressurized fluid within said piston chamber, and a sensed fluid port for enabling entry of a second pressurized fluid into said piston chamber, each of said ports communicating between said piston chamber and exteriorly of said cylinder housing;
   (b) a piston means sealingly and slideably mounted within said piston chamber, said piston means being shorter in length than said piston chamber so as to be capable of longitudinal movement therewithin, said piston means preventing communication between said sensed fluid port and the inlet, outlet and venting ports, said piston means further having a plurality of conduit means so constructed and arranged whereby said piston means has a first position wherein communication is enabled by a conduit between said inlet and outlet ports, and having second and third positions wherein communication is prevented between said inlet and outlet ports but is enabled between said outlet port and said venting ports, said piston further being separated into upper and lower components, said components being mutually threadedly engaged whereby the relative rotation of said components will shorten or lengthen the overall length of said piston, said upper and lower components further defining an internal passageway having a first end communicating with a groove at one end of said piston, said groove being in continuous communication with said inlet port, the internal passageway having a second end defined by a gap between the bottom surface of said uppermost component and a shoulder on said lower component by said outlet port is aligned with said gap, the continous flow of fluid through said inlet port and egressing through said outlet port is enabled, whereby the length of said gap is adjustable by inserting an instrument to engage a cavity formed in the upper surface of said upper component so as to enable the rotation of said upper component with respect to said lower component of said piston thereby widening or narrowing said gap, so as to enable adjustment of the desired range of said pressure sensor wherein fluid is allowed to flow therethrough; and
   (c) resilient means mounted within said piston chamber, said resilient means urging said piston means toward said sensed fluid port, whereby the second pressurized fluid within said piston chamber urges said piston means away from said sensed fluid port so as to oppose said resilient means, whereby if said second pressurized fluid is pressurized within desired values, said piston means will assume said first position within said cylinder housing, and if said second pressurized fluid is pressurized lower than or higher than the desired value, said piston means will assume said second or third position, whereby passage of fluid through said conduit means in said piston means and egressing through said outlet port is permitted only when said piston means is in said first position.

2. The pressure sensor of claim 1, wherein said means for engaging the upper component comprises a hexagonal cavity formed in the upper surface of the upper component of the piston means, said cylinder housing having an opening formed therein so as to enable access to the hexagonal cavity by a hex key or the like, whereby relative rotation of the upper component with respect to the lower component is entitled.

3. The pressure sensor of claim 2, wherein the piston means further includes first and second venting grooves in the surface thereof, said venting grooves being of sufficient length and so arranged on said piston means as to enable said first venting groove to continuously communicate with a first venting port, and said second venting groove to communicate continuously with a second venting port, said first venting groove being in communication with said outlet port when said second pressurized fluid pressure is higher than the desired range, so as to place said piston means in said second position, whereby said outlet port will be enabled to discharge said residual first pressurized fluid through said first venting port, and when said second pressurized fluid pressure is lower than the desired range, said piston means is placed in said third position whereby said outlet port will be in communication with said second venting port so as to be enabled to discharge said first pressurized fluid through said second venting port, said piston means being so constructed as to prevent any communication in any position between said inlet port and either venting port.

4. The pressure sensor of claim 1, further including second adjustment means for increasing or decreasing the force exerted by the resilient means upon the piston means.

5. The pressure sensor of claim 4, wherein the second adjustment means comprises an upper end cap engaging a threaded portion of the interior of the cylinder housing and constraining the resilient means within the cylinder housing, whereby relative rotation of the upper end cap with respect to the cylinder housing will alter the compression of the resilient means so as to adjust the force exerted thereby.

6. The pressure sensor of claim 1, further including an exteriorly mounted threaded lock nut and an external shoulder, whereby said sensor may be mounted in an opening in a rigid panel by placing said rigid panel closely adjacent to and between said lock nut and shoulder so as to secure said pressure sensor with respect to said rigid panel said upper end cap being of equal or smaller external diameter than said cylinder housing, whereby said sensor may be inserted through opening in a rigid panel or the like without requiring the removal or dismantling of said upper end cap from cylinder housing, thereby eliminating the necessity of readjusting said pressure sensor.

7. The pressure sensor of claim 1, wherein said cylinder housing includes a removable lower end cap threadedly engaged with the remainder of said cylinder housing, and wherein the piston means includes a lower portion separate from but capable of contact with the remainder or portion of the piston means whereby the lower portion of the piston means, and the lower end cap may be removed and replaced with a lower portion of smaller or larger diameter, said lower end cap then being re-engaged with the remained of said cylinder housing, whereby the response of said pressure sensor to a fluctuating sensed fluid pressure may be varied.

8. A high and low pressure sensor having a spring loaded piston constrained within a cylinder, opposed by the force exerted by a fluctuating pressurized sensed fluid, said sensor having an inlet port, outlet port, and at least one venting port, the improvement comprising:

separating the piston into upper and lower components, said components being mutually threadedly engaged whereby the relative rotation of said components will shorten or lengthen the overall length of said piston, said upper and lower components further defining an internal passageway having a first end communicating with a groove at one end of said piston, said groove being in continuous communication with said inlet port, the internal passageway having a second end defined by the gap between the bottom surface of said uppermost component and a shoulder on said lower component whereby said outlet port is aligned with said gap, the continuous flow of fluid through said inlet port and egressing through said outlet port is enabled, whereby the length of said gap is adjustable by inserting an instrument to engage a cavity formed in the upper surface of said upper component so as to enable the rotation of said upper component with respect to said lower component of said piston thereby widening or narrowing said gap, so as to enable adjustment of the desired range of said pressure sensor wherein fluid is allowed to flow therethrough.

* * * * *